United States Patent [19]
Crawford et al.

[11] Patent Number: 5,644,610
[45] Date of Patent: Jul. 1, 1997

[54] MULTI-PROCESSOR AFTERGLOW ARTIFACT CORRECTION FILTER FOR USE WITH COMPUTED TOMOGRAPHY SCANNERS

[75] Inventors: Carl R. Crawford, Brookline; Christopher C. Ruth, Danvers; Iouri Bachilov, Peabody; Ruvin Deych, Burlington, all of Mass.

[73] Assignee: Analogic Corporation, Peabody, Mass.

[21] Appl. No.: 690,810

[22] Filed: Aug. 1, 1996

Related U.S. Application Data

[62] Division of Ser. No. 671,219, Jun. 27, 1996.
[51] Int. Cl.$^6$ ........................................ A61B 6/03
[52] U.S. Cl. ............................. 378/19; 378/901
[58] Field of Search ................. 364/413, 15; 378/19, 378/901

[56] References Cited

U.S. PATENT DOCUMENTS

| | | | |
|---|---|---|---|
| 4,547,893 | 10/1985 | Gordon | 378/19 |
| 5,249,123 | 9/1993 | Hsieh | 364/413.19 |
| 5,265,013 | 11/1993 | King et al. | 364/413.21 |
| 5,331,682 | 7/1994 | Hsieh | 378/19 |
| 5,517,544 | 5/1996 | Levinson | 378/4 |

OTHER PUBLICATIONS

Hsieh, J., *Image Artifacts, Causes, And Correlation, Medical CT and Ultrasound: Current Technology and Applications*, (Goldman et al. ed.) Advanced Medical Publishing (1995) pp. 488–518.

*Primary Examiner*—David P. Porta
*Assistant Examiner*—David Vernon Bruce
*Attorney, Agent, or Firm*—Lappin & Kusmer LLP

[57] ABSTRACT

The disclosed CT scanner includes a tomography system for generating data during a scan. The tomography system includes a detector characterized by at least one afterglow amplitude and at least one afterglow time constant, and a sampling device for generating a plurality of samples $x_i$ for all i from zero to MAX minus one of the detector output signal. The scanner also includes a set of N sub-processors for processing the samples $x_i$, each of the sub-processors being represented by a unique integer q selected from zero to N minus one and receiving only the samples $X_{iN+q}$. Each sub-processor includes a device for generating a compensated signal according to a function of at least a portion of the received samples and parameters representative of the afterglow amplitude and the afterglow time constant.

32 Claims, 5 Drawing Sheets

MULTI-PROCESSOR AFTERGLOW ARTIFACT CORRECTION FILTER FOR USE WITH COMPUTED TOMOGRAPHY SCANNERS

This application is a Divisional of U.S. patent application Ser. No. 08/671,219 filed Jun. 27, 1996.

FIELD OF THE INVENTION

The present invention relates generally to computed tomography (CT) scanners used in the medical arts for generating CT images of, for example, human patients. More particularly, the invention relates to an improved filter for reducing artifacts in CT images caused by detector afterglow.

BACKGROUND OF THE INVENTION

Figures 1, 2A:
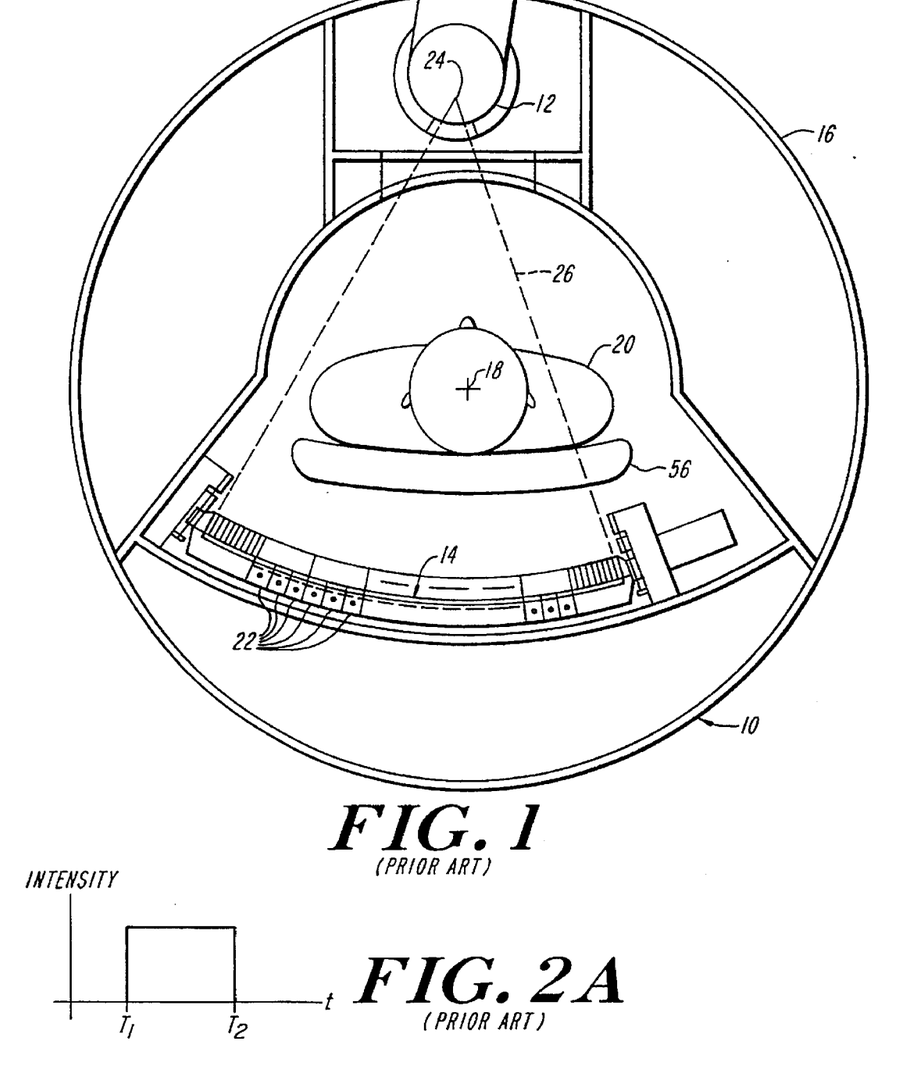
FIG. 1 shows an axial view of a prior art CT scanner.
FIG. 2A shows a graph of the intensity of a pulsed X-ray signal versus time.

FIG. 1 shows an axial view of a third generation CT scanner 10 that includes an X-ray source 12 and an X-ray detector system 14 secured respectively to diametrically opposite sides of an annular-shaped disk 16. The disk is rotatably mounted within a gantry support (not shown) so that during a scan, the disk continuously rotates about a rotation axis 18 (which is normal to the plane of the page in FIG. 1) while X-rays pass from the source 12 through an object, such as a patient 20, positioned within the opening of the disk to the detector system 14.

The detector system 14 typically includes an array of individual detectors 22 disposed as a single row in the shape of an arc of a circle having a center of curvature at the point 24, referred to as the "focal spot", where the radiation emanates from the X-ray source 12. The X-ray source and the array of detectors are positioned so that the X-ray paths between the source and each detector all lie in the same plane (hereinafter the "slice plane" or "scanning plane") which is normal to the rotation axis 18 of the disk. Since the X-ray paths originate from what is substantially a point source and extend at different angles to the detectors, the X-ray paths form a "fan beam" 26 that is incident on the detector array 14. The X-rays incident on a single detector at a measuring instant during a scan are commonly referred to as a "ray", and each detector generates an output signal indicative of the intensity of its corresponding ray. Since each ray is partially attenuated by all the mass in its path, the output signal generated by each detector is representative of the density of all the mass disposed between that detector and the X-ray source (i.e., the density of the mass lying in the detector's corresponding ray path).

The output signals generated by the X-ray detectors are normally processed by a signal processing portion (not shown) of the CT system. The signal processing portion generally includes a data acquisition system (DAS) which filters the output signals generated by the X-ray detectors to improve their signal-to-noise ratio. Such a DAS is described in U.S. Pat. No. 4,547,893, which is assigned to the assignee of the present invention and is hereby incorporated by reference. The filtered output signals generated by the DAS are referred to herein as "projection data signals". The collection of all the projection data signals at a measuring instant is commonly referred to as a "projection" or a "view", and the angular orientation of the source 12 and detector system 14 on the disk 16 corresponding to a particular projection is referred to as the "projection angle".

During a single scan, the disk 16 rotates smoothly and continuously around the object being scanned allowing the scanner 10 to generate a plurality of projections at a corresponding plurality of projection angles. In a typical scan, the disk rotates at least 360° around the object being scanned, and the scanner generates a new projection every time the disk rotates an incremental amount referred to as dθ, where dθ is on the order of 0.125 degrees. So in a typical scan, the scanner may generate on the order of 2,880 (i.e., eight times 360) projections. The sampling interval between measuring adjacent projections (i.e., the time required for the disk to rotate through an angle of dθ), which is referred to by the symbol Δ, is typically on the order of a millisecond.

Using well known algorithms, such as the inverse Radon transform, a CT image may be generated from all the projections measured at each of the projection angles. A CT image is representative of the density of a two dimensional "slice", along the scanning plane, of the object being scanned. The process of generating a CT image from the projections is commonly referred to as "filtered back projection" or "reconstruction", since the CT image may be thought of as being reconstructed from the projection data. The signal processing portion normally includes a back projector for generating the reconstructed CT images from the projections.

One problem with CT scanners is that a variety of noise and error sources may potentially contribute noise or artifacts to the reconstructed CT images. The signal processing portions of CT scanners therefore typically employ a host of signal processing techniques to improve the signal-to-noise ratio and to reduce the presence of artifacts in the reconstructed CT images. U.S. patent application Ser. Nos. 08/584,468, 08/614,623, and 08/614,541, entitled STREAK SUPPRESSION FILTER FOR USE IN COMPUTED TOMOGRAPHY SYSTEMS, MOTION ARTIFACT SUPPRESSION FILTER FOR USE IN COMPUTED TOMOGRAPHY SYSTEMS, and RING SUPPRESSION FILTER FOR USE IN COMPUTED TOMOGRAPHY SYSTEMS, respectively, (Attorney Docket Nos. ANA-081, ANA-086, and ANA-087, respectively), which are assigned to the assignee of the present invention and which are hereby incorporated by reference, disclose several examples of filters for suppressing such artifacts.

Figure 2B:
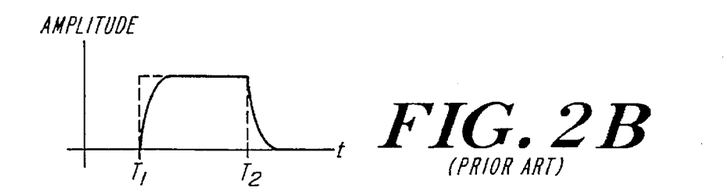
FIG. 2B shows a graph of the amplitudes of the output signals generated by an ideal detector and by an actual detector in response to the signal shown in FIG. 2A.

One important factor that can cause unwanted artifacts to appear in the reconstructed CT images relates to the time response of the detectors. FIGS. 2A and 2B shows graphs that illustrate the time response of a typical X-ray detector. FIG. 2A shows a graph of the intensity of a pulsed X-ray signal verses time. The signal includes an X-ray pulse having a non-zero intensity that occurs between times $T_1$ and $T_2$, and the intensity of the signal is zero for all other times. FIG. 2B shows a graph of the output signals generated in response to this X-ray pulse by an ideal detector and by an actual detector. An ideal X-ray detector would be characterized by an instantaneous time response, and would therefore respond instantaneously to the X-ray pulse and would generate an output signal having an amplitude indicated by the dashed line in FIG. 2B. Since actual detectors are characterized by non-instantaneous time responses, an actual detector would generate an output signal characterized by an exponential rise following the beginning of the pulse at time $T_1$ and an exponential decay following the end of the pulse at time $T_2$ as indicated by the solid line in FIG. 2B. The deviation from an ideal response, i.e., the rise and decay times, are referred to collectively herein as "afterglow". The term "afterglow" often colloquially refers to the tendency of a scintillator within a detector to continue to "glow" or emit light even after the cessation of incident X-ray radiation (i.e., the exponential decay following the end of an X-ray pulse). However, as used herein the term "afterglow" refers both to the exponential decay and the exponential rise.

Ideally, during a scan, each projection is measured independently of all other projections. However, afterglow tends to make each projection partially dependent on previously measured projections (i.e., projections taken at preceding projection angles). Afterglow therefore tends to introduce unwanted artifacts into reconstructed images. For example, in third generation CT scanners, afterglow often introduces ring-like artifacts, referred to as "rings", into the reconstructed images.

Figure 3:
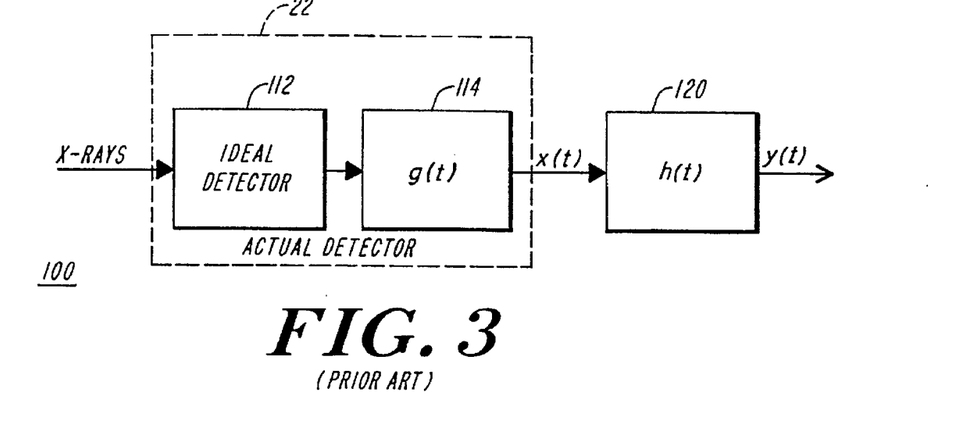
FIG. 3 shows a block diagram of a prior art deconvolution system.

FIG. 3 shows a block diagram of a prior art system 100 that compensates for afterglow artifacts. In this system, an X-ray detector 22 is modeled as a theoretically ideal detector 112 followed by a filter 114, where filter 114 represents the unwanted imperfections present in any particular physically realizable detector. A filter 120 receives the output signal x(t) generated by detector 22 and generates therefrom a corrected signal y(t). The ideal detector 112 has an instantaneous time response and filter 114 is therefore responsible for introducing afterglow effects into the detector output signal x(t). Filters 114, 120 are characterized by transfer functions g(t), h(t), respectively. g(t) is determined by the physical characteristics of the detector 22, and h(t) is selected to be the inverse transfer function of g(t) so that g(t) and h(t) satisfy the following Equation (1)

$$g(t)*h(t)=\delta(t) \quad (1)$$

where "*" represents the convolution operator and where $\delta(t)$ represents an impulse (or Dirac delta) function. When h(t) is selected in this manner, filter 120 removes, or compensates for, any afterglow artifacts introduced by filter 114 so that y(t) is equivalent to the output of the theoretically ideal detector 112. System 100 is referred to as a "deconvolution" system, since filter 120 "deconvolves", or removes, the effect of the unwanted filter 114. U.S. Pat. Nos. 5,265,013 and 5,517,544 disclose deconvolution systems for compensating for afterglow artifacts.

As is well known, the impulse response g(t) of filter 114, for purposes of afterglow considerations, may be described as the sum of an impulse function and an exponentially decaying afterglow term as shown by the following Equation (2)

$$g(t) = \begin{cases} \delta(t) + \beta e^{-\frac{t}{\tau}} & \text{for } t \geq 0 \\ 0 & \text{for } t < 0 \end{cases} \quad (2)$$

where t represents time, $\tau$ represents the time constant for the afterglow term, and $\beta$ represents the amplitude of the afterglow term. When $\beta$ is much smaller than one (i.e., $\beta \ll 1$), the inverse transfer function h(t) for filter 120 is given by the following Equation (3).

$$h(t) = \begin{cases} \delta(t) - \beta e^{-\frac{t}{\tau}} & \text{for } t \geq 0 \\ 0 & \text{for } t < 0 \end{cases} \quad (3)$$

Filter 120 may be implemented as a digital filter that generates a sequence of output samples $y_i$ from a sequence of input samples $x_i$ according to the following Equation (4)

$$y_i = \sum_{j=-\infty}^{\infty} x_j h_{i-j} \quad (4)$$

where $x_i$ represents the input sample measured at time i, $y_i$ represents the output sample generated at time i, and the discrete transfer function $h_i$ of filter 120 is given by the following Equation (5)

$$h_i = \begin{cases} \delta_i + f_i = \delta_i - \beta e^{-\frac{i\Delta}{\tau}} & \text{for } i \geq 0 \\ 0 & \text{elsewhere} \end{cases} \quad (5)$$

and where $\delta_i$ is given by the following Equation (6)

$$\delta_i = \begin{cases} 1 & i=0 \\ 0 & i \neq 0 \end{cases} \quad (6)$$

and where $\Delta$ represents the sampling interval (i.e., the time interval between measuring consecutive samples $x_i$ and $x_{i+1}$).

One problem with constructing filter 120 according to the above Equation (4) is that the transfer function $h_i$ has an infinite response so filter 120 would require an infinite number of taps. Even if the transfer function $h_i$ were truncated, filter 120 would still be required to perform an impractically large number of computations to generate a single output sample $y_i$.

Figure 4:
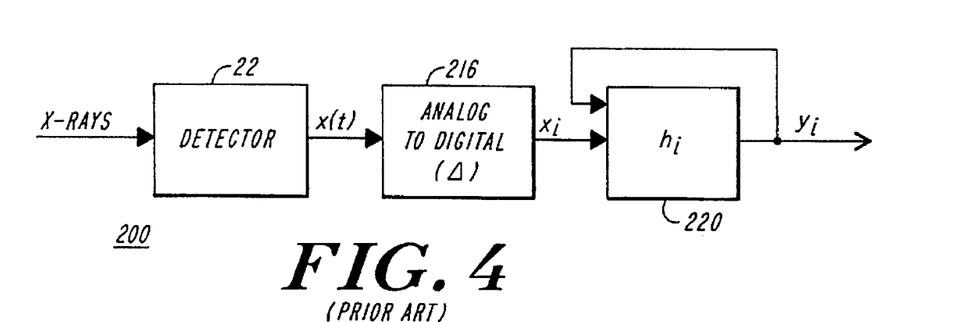
FIG. 4 shows a block diagram of a prior art recursive digital deconvolution system.

One way to reduce the number of computations required to implement a deconvolution system is to use a recurslye filter to perform the deconvolution. FIG. 4 shows a block diagram of a prior art digital recursive deconvolution system 200 that includes a detector 22 (which is modeled as a theoretically ideal detector 112 followed by a filter 114, as shown in FIG. 3), an analog-to-digital converter 216, and a recursive filter 220. The output signal x(t) generated by detector 22 is applied to analog-to-digital converter 216 which generates a sequence of samples $x_i$ by sampling the signal x(t) using a sampling interval having a duration equal to $\Delta$. The samples $x_i$ are applied to recursive filter 220 that generates the set of corrected output samples $y_i$ according to the following recursive Equation (7)

$$y_i = c_0 x_i + c_1 x_{i-1} + c_2 y_{i-1} \quad (7)$$

where $c_0$, $c_1$, and $c_2$ are constants that are algebraically related to the parameters $\beta$, $\tau$, and $\Delta$ according to the following Equation (8)

$$c_0 = 1 - \beta \quad (8)$$
$$c_1 = -e^{-\frac{\Delta}{\tau}}$$
$$c_2 = e^{-\frac{\Delta}{\tau}}$$

where the initial output term $y_1$ is equal to the initial input term $x_1$.

The Z-transform may be used to show that the transfer function of filter 220 (when implemented according to Equation (7)) is equivalent to the above Equation (3), so system 200 is functionally equivalent to system 100 (shown in FIG. 3). As those skilled in the art will appreciate, system 200 is advantageous over system 100, since recursive filter 220 may be implemented according to Equation (7) as a three tap filter, and need not perform an infinite number of calculations to generate the sequence of output samples.

Figure 5:
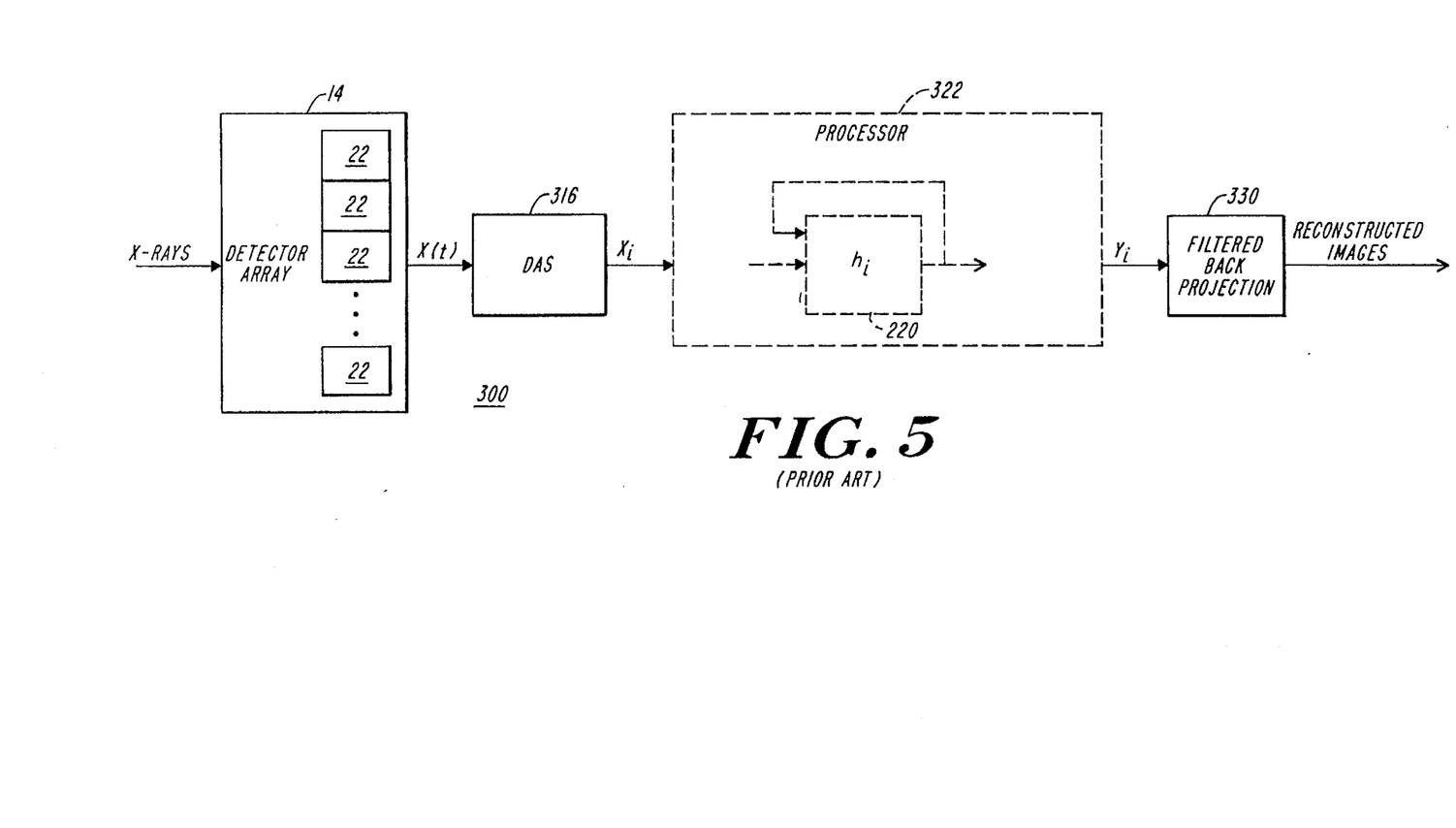
FIG. 5 shows a block diagram of the signal processing portion of a prior art CT scanner including the recursive afterglow correction filter shown in FIG. 4.

FIG. 5 shows a block diagram of the signal processing portion of a prior art CT scanner 300 that uses recursive filter 220 to compensate for afterglow artifacts. Scanner 300 includes detector array 14, a data acquisition system (DAS) 316, a processor 322, and a filtered back projection module 330. Detector array 14 includes a plurality of individual detectors 22, and each individual detector 22 generates an output signal x(t) in response to incident X-ray radiation. The vector X(t) includes the collection of all the output signals x(t) generated by the individual detectors 22, and the vector X(t) is applied to DAS 316. During a scan, as the detector array 14 and the X-ray source (shown in FIG. 1) rotate around the object being scanned, the DAS 316 filters and periodically samples (using a sampling interval of duration equal to $\Delta$) the vector X(t) and generates a sequence of vectors $X_0, X_1, \ldots, X_{MAX-1}$, where the total number of projections generated during a scan is equal to MAX, which as stated above, may be on the order of 2880. The i'th vector $X_i$ represents the projection collected at the i'th projection angle and includes one sample of the output signals generated by each individual detector 22 in array 14. Processor 322 receives and performs a number of filtering operations on the vectors $X_i$ for all integers i from zero to MAX minus one, and generates therefrom a sequence of corrected vectors $Y_i$ for all integers i from zero to MAX minus one and the corrected vectors are applied to filtered back projection module 330 which generates therefrom the reconstructed images.

Processor 322 typically includes several filters, and each of these filters provides correction for a specific type of artifact or noise source. One of the filters included in processor 322 may be recursive filter 220 which provides correction for the afterglow artifacts.

One problem with scanner 300 is that processor 322 is required to perform a very large number of computations. Detector array 14 normally includes a large number of detectors (e.g., CT scanners manufactured by the assignee of the present invention typically include three hundred eighty four detectors), and most modern CT scanners perform a single scan in, on the order of, two seconds. To perform all the calculations required to process all the signals generated by detector array 14 in only two seconds, processor 322 must be a very powerful (e.g., on the order of one hundred fifty million floating point operations per second) processor. If processor 322 is implemented using a single processor or computer, processor 322 must be a relatively expensive processor.

Figure 6:
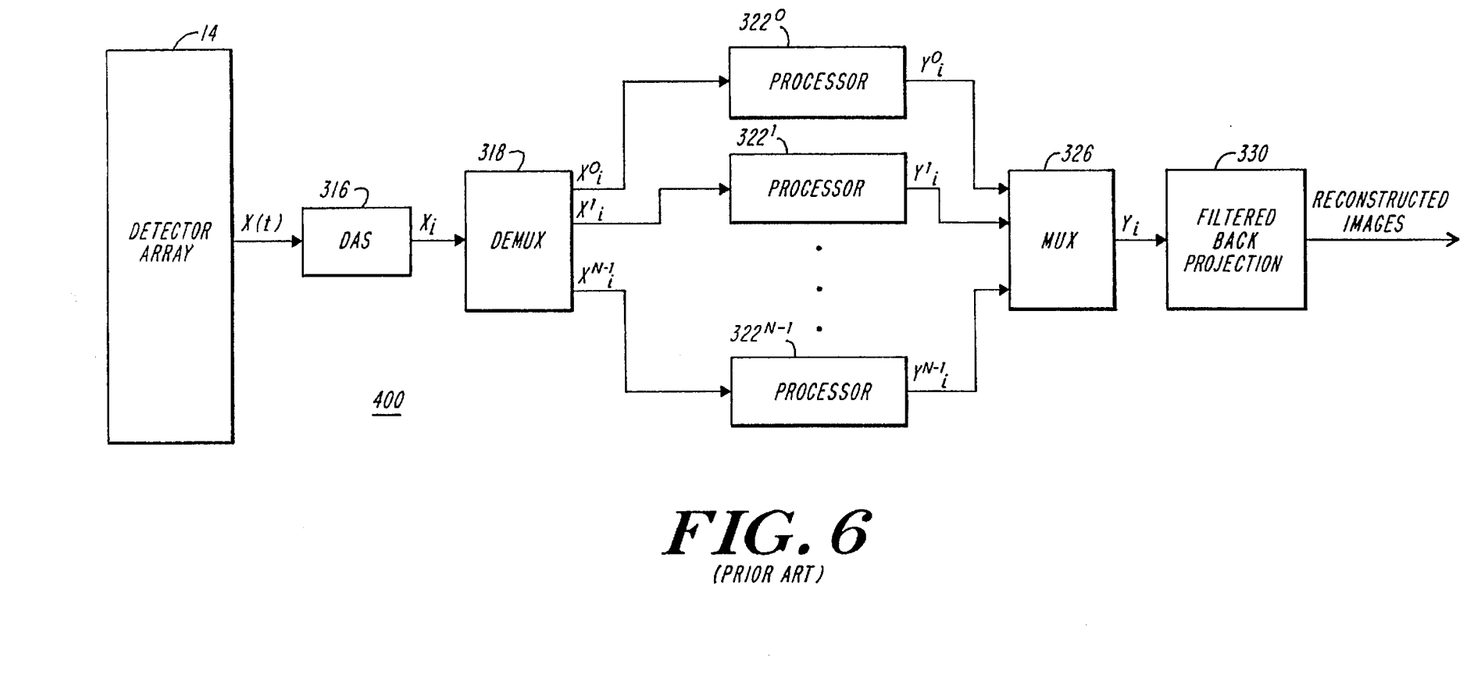
FIG. 6 shows a block diagram of the multi-processor signal processing portion of a prior art CT scanner.

One way to reduce the cost of a CT scanner is to use parallel processing techniques and to implement processor 322 using an array processor that includes a set of relatively inexpensive sub-processors. FIG. 6 shows a block diagram of the signal processing portion of a prior art CT scanner 400 in which processor 322 is implemented using N sub-processors $322^0, 322^1, \ldots, 322^{N-1}$. In scanner 400 the sequence of vectors $X_i$ generated by DAS 316 is applied to a de-multiplexor 318 which generates therefrom N vector sequences $X_i^q$ according to the following Equation (9)

$$X_i^q = X_{iN+q} \qquad (9)$$

for all integers q from zero to N minus one (i.e., q=0, 1, 2, ... N−1I). The q'th vector sequence $X_i^q$ is applied to the q'th sub-processor $322^q$, so sub-processor $322^0$ receives vectors $X_0, X_N, X_{2N}, \ldots$, and sub-processor $322^1$ receives vectors $X_1, X_{N+1}, X_{2N+1}, \ldots$, and so on. The q'th sub-processor $322^q$ generates a sequence of output vectors $Y_i^q$, which are described by the following Equation (10).

$$Y_i^q = Y_{iN+q} \qquad (10)$$

The output vectors generated by the sub-processors $322^0$–$322^{N-1}$ are applied to a multiplexor 326 which generates therefrom the output vectors $Y_i$ for all integers i from zero to MAX minus one which are then applied to the filtered back projection module 330.

Since each sub-processor only processes a fraction of the vectors $X_i$, the sub-processors are less complex and less expensive than the single processor 322 used in system 300 (shown in FIG. 3). However, one problem with system 400 is that the sub-processors cannot implement recursive deconvolution filter 220 (shown in FIG. 4). As described by the above Equation (7), to compute the i'th vector $Y_i$ for the i'th projection angle, the recursive filter 220 requires the data from the previous adjacent (i.e., i minus one) projection angle, and in system 400 none of the sub-processors receive vectors from adjacent projection angles and instead only receive vectors that are spaced apart by N. There is therefore a need for an afterglow correction filter that may be implemented by a set of parallel sub-processors.

OBJECTS OF THE INVENTION

It is an object of the present invention to substantially reduce or overcome the above-identified problems of the prior art.

Another object of the present invention is to provide a multi-processor afterglow artifact correction filter.

And another object of the present invention is to provide an improved CT scanner that includes a set of N sub-processors for processing a set of samples $x_i$ generated by a detector characterized by an afterglow amplitude and an afterglow time constant, the q'th sub-processor receiving only the samples $x_{iN+q}$ and generating a compensated signal according to a function of at least a portion of the samples $X_{iN+q}$ and parameters representative of the afterglow amplitude and the afterglow time constant.

Yet another object of the present invention is to provide an improved CT scanner that includes a set of N sub-processors for processing a set of samples $x_i$ generated by a detector characterized by an afterglow amplitude and an afterglow time constant, the q'th sub-processor receiving only the samples $x_{iN+q}$ and including a filter for generating a compensated signal from the received samples $X_{iN+q}$ and including a device for adjusting the filter's transfer function according to a function of parameters representative of the afterglow amplitude and the afterglow time constant.

Still another object of the present invention is to provide an improved CT scanner that includes a set of N sub-processors for processing a set of samples $x_i$ generated by a detector characterized by a first transfer function, the q'th sub-processor receiving only the samples $X_{iN+q}$ and including a filter characterized by a second transfer function for generating a compensated signal from the received samples $X_{iN+q}$, the second transfer function being substantially an inverse of at least a portion of the first transfer function.

And yet another object of the present invention is to provide an improved CT scanner that includes a set of N sub-processors for processing a set of samples $x_i$ generated by a detector, the q'th sub-processor receiving only the samples $X_{iN+q}$ and including a recursive filter for generating a compensated signal from the received samples $X_{iN+q}$.

And still another object of the present invention is to provide an improved CT scanner that includes an afterglow correction filter characterized by a transfer function, where the transfer function is a function of temperature of the X-ray detectors.

SUMMARY OF THE INVENTION

These and other objects are provided by an improved CT scanner that includes a detector for generating a plurality of samples $x_i$, the detector being characterized by at least one afterglow amplitude and at least one afterglow time constant. The scanner also includes a set of sub-processors for processing the samples, a q'th one of the sub-processors receiving only the samples $x_{iN+q}$. Each sub-processor includes a device for generating a compensated signal from the received samples. In one form, the device may generate the compensated signal according to a function of parameters representative of the afterglow amplitude and the afterglow time constant. In another form, the device may be a filter characterized by a transfer function, and the transfer function may be a function of parameters representative of the afterglow amplitude and the afterglow time constant. In yet another form, the transfer function may be substantially an inverse of at least a portion of a transfer function that characterizes the detector. In other aspects, the device may operate according to a function of the detector's temperature.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE DRAWINGS

For a fuller understanding of the nature and objects of the present invention, reference should be made to the following detailed description taken in connection with the accompanying drawings in which the same reference numerals are used to indicate the same or similar parts wherein.

DETAILED DESCRIPTION OF THE DRAWINGS

Figure 7:
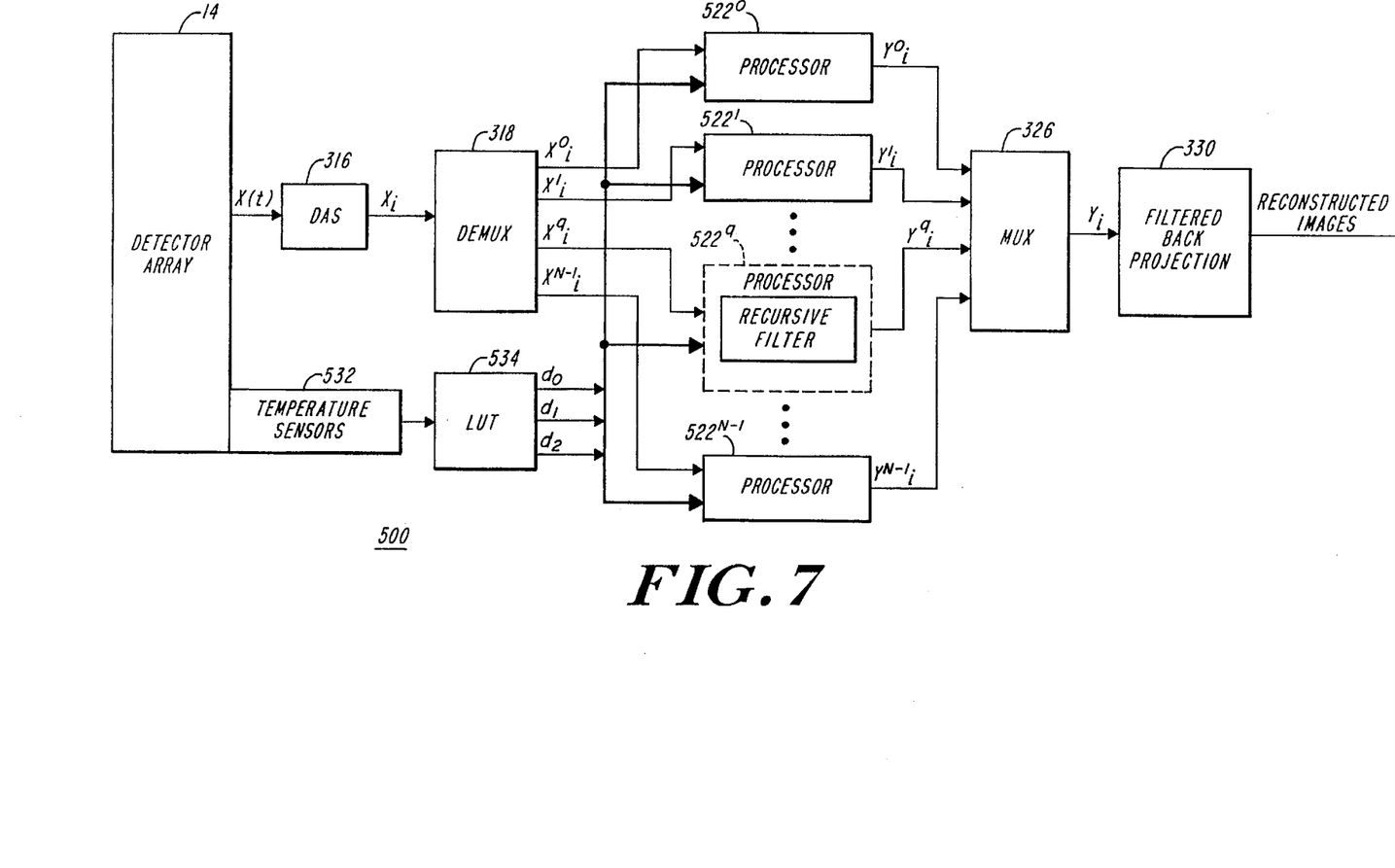
FIG. 7 shows a block diagram of a multi-processor signal processing portion of a CT scanner constructed according to the invention and including multi-processor afterglow artifact correction filters.

FIG. 7 shows a block diagram of the signal processing portion of an improved CT scanner 500 constructed according to the invention. Scanner 500 is similar to scanner 400 (shown in FIG. 6), however, rather than prior art sub-processors $322^1$–$322^{N-1}$, improved scanner 500 includes N sub-processors $522^1$–$522^{N-1}$, and as will be discussed in greater detail below, each sub-processor, represented by the expression the q'th sub-processor $522^q$, for all integers q from zero to N minus one, includes a recursive filter $520^q$ used for suppressing afterglow artifacts. Scanner 500 additionally includes a temperature sensor 532 and a memory look up table (LUT) 534. As will be discussed in greater detail below, the temperature sensor 532 measures the temperature of the detectors in array 14 and generates, in cooperation with LUT 534, a set of coefficients $d_0$, $d_1$, and $d_2$, which are applied to the N sub-processors $522^0$, $522^1$, . . . , $522^{N-1}$.

The q'th sub-processor $522^q$ receives the vector sequence $X_i^q$, which is described by the above Equation (9), and generates therefrom the vector sequence $Y_i^q$, which is described by the above Equation (10), for all integers q from zero to N minus one. The q'th vector $X_i^q$ includes a set of P samples $x_i^q$ where P is the number of individual detectors (e.g., three hundred eighty four) in array 14, and similarly, the q'th vector $Y_i^q$ includes a set of P samples $y_i^q$, and the samples $x_i^q$ and $y_i^q$ are given by the following Equation (11).

$$x_i^q = x_{iN+q}$$
$$y_i^q = y_{iN+q} \qquad (11)$$

The procedure that the q'th recursive filter $520^q$ uses to process the samples $x_i^q$ and $Y_i^q$ from a single detector will now be discussed, and those skilled in the art will appreciate that the filter $520^q$ uses a similar procedure to process all the other samples in the vectors $X_i^q$ and $Y_i^q$ generated in response to other detectors in array 14.

Figure 8:
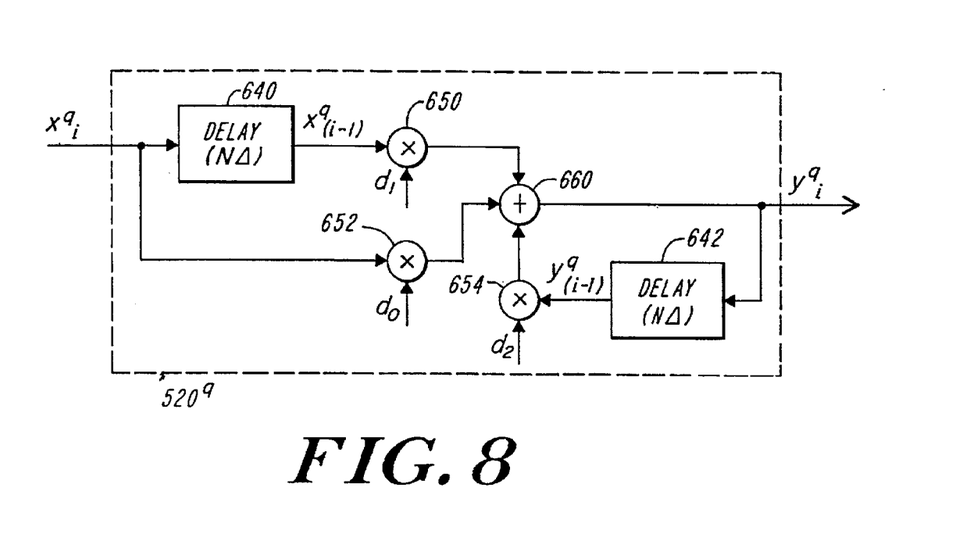
FIG. 8 shows a block diagram of one of the afterglow artifact correction filters shown in FIG. 7 and constructed according to the invention.

FIG. 8 shows a block diagram of one embodiment of the q'th recursive filter $520^q$ constructed according to the invention. Filter $520^q$ receives the input samples $x_i^q$ and generates therefrom the output samples $y_i^q$. The input samples xhd i$^q$ may be the samples generated by DAS 316 (shown in FIG. 7), or alternatively, may be the output samples generated by some other filter, or may be samples of the output signals generated by detector array 14. Filter $520^q$ includes two registers or delay modules 640, 642, three signal multipliers 650, 652, 654, and a signal adder 660. The i'th input sample $x_i^q$ is applied to an input terminal of signal multiplier 652, and this multiplier is configured to generate an output signal by multiplying its input by the coefficient $d_0$. The i'th input sample $x_i^q$ is also applied to the input terminal of delay module 640 which delays the sample by a duration of N times the sampling interval $\Delta$ so that the output signal generated by module 640 is representative of the previous input sample $x_{(i-1)}^q$. The output signal generated by module 640 is applied to an input terminal of signal multiplier 650, and this multiplier is configured to generate an output signal by multiplying its input by the coefficient $d_1$. Signal adder 660 generates the output signal of filter $520^q$ by summing the signals present at its three input terminals, and the output signals generated by signal multipliers 650, 652 are applied to two of the three input terminals of adder 660. The output signal generated by adder 660 is applied to the input terminal of delay module 642, which delays the signal by a duration of N times the sampling interval $\Delta$. The delayed output signal generated by module 642 is applied to an input terminal of signal multiplier 654, and this multiplier is configured to generate an output signal by multiplying its input by the coefficient $d_2$. The output signal generated by signal multiplier 654 is applied to the remaining input terminal of adder 660. So, filter $520^q$ generates the output sample $y_i^q$ according to the following recursive Equation (12)

$$y_i^q = d_0 x_i^q + d_1 x_{i-1}^q + d_2 y_{i-1}^q \quad (12)$$

where $d_0$, $d_1$, and $d_2$ are preferably given by the following Equation (13)

$$d_0 = 1 - N\beta \quad (13)$$

$$d_1 = -e^{\frac{-N\Delta}{\tau}}$$

$$d_2 = e^{\frac{-N\Delta}{\tau}}$$

The inventors have discovered that implementing recursive filter $520^q$ in this fashion advantageously suppresses afterglow artifacts in the reconstructed images. While FIG. 8 shows a hardware type implementation of filer $520^q$, those skilled in the art will appreciate that this filter may be implemented using hardware or software, and is preferably implemented as software running on sub-processor $522^q$.

The effectiveness of recursive filter $520^q$ may be understood by analyzing the mathematical equations that describe the operation of prior art filter 120 (shown in FIG. 3) and recursive filter $520^q$. The above equation (4) may be rewritten, by splitting the single summation into two summations, as shown by the following Equation (14).

$$y_i = \sum_{m=-\infty}^{\infty} \sum_{n=mN}^{N(m+1)-1} x_n h_{i-n} \quad (14)$$

Substituting the above Equation (11) into Equation (14) yields the following Equation (15).

$$y_i^q = \sum_{m=-\infty}^{\infty} \sum_{n=mN}^{N(m+1)-1} x_n h_{iN+q-n} \quad (15)$$

Now, substituting the above Equation (5) into Equation (15) yields the following Equation (16).

$$y_i^q = x_{iN+q} + \sum_{m=-\infty}^{\infty} \sum_{n=mN}^{N(m+1)-1} x_n f_{iN+q-n} \quad (16)$$

Using the above Equation (11) in Equation (16) yields the following Equation (17).

$$y_i^q = x_i^q + \sum_{m=-\infty}^{\infty} \sum_{n=mN}^{N(m+1)-1} x_n f_{iN+q-n} \quad (17)$$

If it is assumed that the values of $f_{iN+q-n}$ are constant over the inner summation in the above Equation (17), then this term may be withdrawn from the inner summation by selecting any particular set of values for q and n (e.g., q=0 and n=mN) which yields the following Equation (18).

$$y_i^q = x_i^q + \sum_{m=-\infty}^{\infty} f_{(i-m)N} \sum_{n=mN}^{N(m+1)-1} x_n \quad (18)$$

Similarly, if it is assumed that the values of $x_n$ are constant over the inner summation, then the inner summation of Equation (18) may be replaced with N times one of the values of $x_n$. Choosing n equal to mN plus q (i.e., $x_{mN+q}$) yields the following Equation (19).

$$y_i^q = x_i^q + N \sum_{m=-\infty}^{\infty} f_{(i-m)N} x_{mN+q} \quad (19)$$

Finally, substituting the above Equation (11) into Equation (19) yields the following Equation (20).

$$y_i^q = x_i^q + N \sum_{m=-\infty}^{\infty} f_{(i-m)N} X_m^q \quad (20)$$

The above Equation (20) was derived from Equation (4), and Equation (20) also describes a type of filter that can be implemented by the sub-processors $522^0$, $522^1$, ..., $522^{N-1}$ (shown in FIG. 7). In the same fashion that the Z-transform may be used to show that prior art recursive filter 220 (shown in FIG. 4), when implemented according to the above Equation (7), is equivalent to filter 120 (shown in FIG. 3), when implemented according to Equation (4), it may also be shown that recursive filter $520^q$, when implemented according to the above Equation (12), is equivalent to a filter that implements the above Equation (20). From viewing Equation (20), those skilled in the art will appreciate that the transfer function $H_i$ of filter $520^q$ is given by the following Equation (21).

$$H_i = \delta_i - N\beta e^{\frac{-iN\Delta}{\tau}} \quad (21)$$

Two assumptions were made during the derivation of the above Equation (20): (1) that $f_{iN+q-n}$ was constant over the inner summation of Equation (17), and (2) that $x_n$ was constant over the inner summation of Equation (18). Therefore, as long as these assumptions are valid, or at least approximately correct, the recursive filters $522^q$ will provide effective suppression of afterglow artifacts.

In typical CT scanners, the sampling interval $\Delta$ (i.e., the time between measuring projections) is on the order of one millisecond, whereas the time constant of the afterglow (i.e., the term r in the above Equation (3)) is on the order of hundreds of milliseconds. Therefore, as long as the number of processors N in scanner 600 is relatively small, the first assumption will be valid. In one preferred embodiment, the value of N is four, and scanner 600 includes four processors $522^0$, $522^1$, $522^2$, and $522^3$. The inventors have discovered that the second assumption is also generally correct since the value of any projection data signal typically does not change radically over a small number (i.e., N) of projections.

As described by the above Equations (12) and (13), the operation of the recursive filters $520^q$ depend on the parameters N, $\Delta$, $\beta$, and $\tau$. For any given CT scanner, the number of processors N, and the sampling interval $\Delta$ are fixed. However, the parameters $\beta$ and $\tau$, which describe the amplitude and the time constant, respectively, of the afterglow may be different for each detector. Preferably, before improved scanner 500 (shown in FIG. 7) is used to generate any CT images, the performance of each of the P detectors in array 14 is measured, and a set of parameters $\beta$ and $\tau$ are preferably selected that accurately characterize the afterglow behavior of each detector.

One method of measuring the parameters $\beta$ and $\tau$ for a detector is to measure the output signal generated by that detector while that detector is exposed to a relatively long burst (e.g., four seconds) of X-ray radiation, and to continue measuring the detector output signal after the incident radiation is interrupted (e.g., by closing a mechanical shutter disposed between the X-ray source and the detector array, or by turning off the power supply for the X-ray source). The parameters $\beta$ and $\tau$ for that detector may then be extracted from the measured data. The response of the detector measured during the radiation burst may be used to normalize the measurements taken after the cessation of the incident radiation. Since the detector output signal decays exponentially after the incident radiation is interrupted, taking the logarithm of this data generates a relatively linear curve. So, the logarithm of this data may then be fit to a line (e.g., by a mean-square fit), and the amplitude β is given by the Y-axis intercept of that line, and the time constant τ is given by the slope of that line.

Other components in the scanner (e.g., the DAS) may have time constants that are shorter than the detector afterglow time constant τ, but that also affect the detector output signal after the cessation of incident radiation. It may therefore be preferable to only use data measured after a waiting period following the interruption of incident radiation to calculate the parameters β and τ. For example, one preferred method is to only take the logarithm of data measured approximately two hundred milliseconds after the interruption of incident radiation. Waiting this two hundred milliseconds allows the effects of the DAS to sufficiently decay, and the detector afterglow is still sufficiently present after two hundred milliseconds to permit accurate measurement of β and τ.

Since centripetal forces may also effect the detector response, it may be preferable to measure the afterglow parameters β and τ while the disk and detector array are stationary, and to use known methods for compensating for any artifacts introduced into the reconstructed CT images by the centripetal forces generated by rotation of the disk during a CT scan.

As shown in FIG. 7, system 500 includes temperature sensor 532 and LUT 534 for generating the coefficients $d_0$, $d_1$, and $d_2$ that are used by the recursive filters $520^0$–$520^{N-1}$. The inventors have discovered that the detector afterglow parameters β and τ normally vary according to a function of the detector's temperature. It is therefore preferable to measure the parameters β and τ for a range of operating temperatures. In the illustrated embodiment of system 500, the parameters β and τ are measured as described above for each detector in array 14 for a range of temperatures. The coefficients $d_0$, $d_1$, and $d_2$ for each detector in array 14 are then precalculated according to the above Equation (13) for several temperatures in that range using the measured values of the temperature dependent parameters β and τ. The precalculated values of the coefficients $d_0$, $d_1$, and $d_2$ are then stored in LUT 534. During operation or scanning, the temperature sensor 532 measures the temperature of each detector in array 44, and the temperature signal generated by sensor 532 is used to access appropriate memory locations in LUT 534 and thereby select an appropriate set of coefficients $d_0$, $d_1$, and $d_2$ for each detector, and these coefficients are then applied to each of the N sub-processors $522^0$, $522^1$, ..., $522^{N-i}$. The coefficients generated by LUT 534 may be considered as a parameter signal that represents the afterglow characteristics of the detectors according to a function of temperature.

In one preferred embodiment, temperature sensor 532 measures the temperature of the detectors immediately prior to the beginning of each scan, and those temperature values are then used to generate the coefficients $d_0$, $d_1$, and $d_2$ that are used during that scan. In other embodiments, the coefficients $d_0$, $d_1$, and $d_2$ could be updated during a scan, but this is generally not necessary since the temperature of the detectors do not tend to shift appreciably during the time required to complete a single scan.

The temperature sensor 532 may be implemented using a different sensor for measuring the temperature of each detector in array 14 (i.e., an array of P temperature sensors). Alternatively, fewer temperature sensors may be used and may be distributed along detector array 44. Such a system of temperature sensors 532 is disclosed in U.S. Pat. No. 5,444,752, entitled TOMOGRAPHY DETECTOR TEMPERATURE EQUALIZATION (Attorney Docket No. ANA-047), and a system for processing the sensor output signals is disclosed in U.S. Pat. No. 5,553,113, based upon U.S. patent application Ser. No. 08/342,311, entitled AUXILIARY DATA ACQUISITION IN A MEDICAL IMAGING SYSTEM (Attorney Docket No. ANA-059), which are assigned to the assignee of the present invention and are hereby incorporated by reference. In one preferred embodiment, sensor 532 is implemented using six sensors that are evenly spaced along detector array 14. During a scan, a polynomial curve is fit to the temperatures measured by the distributed sensors so that the curve provides an estimate of the temperature of each detector in array 14.

While the illustrated embodiment of FIG. 7 shows scanner 500 as including LUT 534, those skilled in the art will appreciate that alternative embodiments of scanner 500 may not include LUT 534 and may instead include a processing component, such as a microprocessor, for generating the coefficients $d_0$, $d_1$, and $d_2$ in response to the temperature signal supplied by sensor 532. For example, during measurement or characterization of the detectors, a polynomial expression may be developed for each detector so that the detector's temperature is a parameter of the polynomial expression and so that the polynomial expression will accurately or approximately compute the afterglow parameters β and τ for that detector according to a function of the detector's temperature. Such polynomial expressions may be developed for example by using known mathematical techniques to fit analytic curves to measured data. The processing component may then be appropriately programmed so that during operation or scanning, the processing component uses a measurement of each detector's temperature provided by sensor 532 and the appropriate polynomial expression for that detector to compute the coefficients $d_0$, $d_1$, and $d_2$ for that detector. In this fashion, the processing component computes the coefficients $d_0$, $d_1$, and $d_2$ for all the detectors and applies these coefficients to the N sub-processors $522^0$, $522^1$, ..., $522^N$.

The inventors have implemented and testa system 500 using both actual and simulated CT data, and have found that the afterglow artifact suppression provided by system 500 is, for practical purposes, indistinguishable from the afterglow artifact suppression provided by prior art system 300 (shown in FIG. 3). So the invention provides an effective multi-processor afterglow artifact suppression filter that is at least as effective as, and is less expensive than, prior art non-multi-processor filters. Further, the inventors' discovery that the afterglow parameters β and τ are temperature dependent may be used to improve multi-processor as well as single processor afterglow artifact filters. For example, variations of prior art system 200 (shown in FIG. 4) may be constructed according to the invention that measure the temperature of detector 22 and use this temperature measurement to adjust the transfer function of filter 220 (e.g., adjust the coefficients $c_0$, $c_1$, $c_2$ of the above Equation (8)).

The invention has thus far been described with reference to the above Equation (2) in which the detector afterglow is described by a single exponential decay term. Those skilled in the art will appreciate that detector afterglow may be more accurately modeled as a multi-exponential series, and that the impulse response g(t) of filter 114 (shown in FIG. 3) may be more accurately described by the following Equation (22)

$$g(t) = \delta(t) + \sum_{i=1}^{M} \beta_i e^{-\frac{t}{\tau_i}} \tag{22}$$

where $\tau_i$ represents the time constant for the i'th afterglow term, $\beta_i$ represents the amplitude of the i'th afterglow term, and M represents the number of afterglow terms in the series. Different types of detectors may be characterized by different values for the afterglow parameters $\tau_i$, $\beta_i$, and M, and depending on the values of these afterglow parameters the detectors may introduce one or more different types of artifacts into the reconstructed CT images.

The inventors have discovered that recursive filters constructed according to the invention (e.g., filter 520$^q$) are particularly effective at suppressing "ring-like" afterglow artifacts that are caused by afterglow time constants $\tau$ in the range of 200 to 1300 milliseconds when the product of the amplitude and the time constant (i.e., $\beta\tau$) is on the order of $5\times10^{-4}$. Such afterglow artifacts are commonly caused by the popular Cadmium-Tungstate type detectors. So, filters constructed according to the invention that implement the above Equation (12), which was of course derived using the above single-term exponential decay Equation (2), provide excellent suppression of afterglow artifacts, and in particular, provide excellent suppression of afterglow artifacts characteristic of Cadmium-Tungstate detectors. However, those skilled in the art will appreciate that the invention also embraces filters that implement Equations derived in similar fashion using the above multi-exponential Equation (22).

The invention has thus far been discussed in terms of third generation CT scanners, however, those skilled in the art will appreciate that principles taught herein may also be applied to other types of CT scanners including fourth generation devices, as well as to other systems including radiation detectors that are characterized by afterglow. Therefore, since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. A system for processing an output signal generated by a detector as a function of an intensity of radiation incident on said detector, the signal response of the detector being characterized by afterglow represented as a function of at least one afterglow amplitude and at least one afterglow time constant, the system including means for measuring the temperature of the detector and for generating a parameter signal according to a function of said temperature, said parameter signal being representative of said afterglow amplitude and said afterglow time constant.

2. A system according to claim 1, further including means for generating a compensated signal according to a function of the output signal and said parameter signal.

3. A system according to claim 2, wherein said means for generating a compensated signal generates said compensated signal according to the following equation $$y_i = c_0 x_i + c_1 x_{i-1} + c_2 y_{i-1}$$

wherein $y_i$ represents a current sample of said compensated signal, $y_{i-1}$ represents a previous sample of said compensated signal, $x_i$ represents a current sample of said output signal, $x_{i-1}$ represents a previous sample of said output signal, and $c_0$, $c_1$, and $c_2$ are coefficients that are functions of said parameter signal.

4. A system according to claim 1, further including filter means for filtering the output signal and thereby generating a compensated signal, said filter means being characterized by a transfer function and including means for adjusting said transfer function according to a function of said parameter signal.

5. A system according to claim 4, wherein said transfer function is substantially equal to $$\delta_i - \beta e^{-\frac{i\Delta}{\tau}}$$

wherein $\beta$ is a function of said parameter signal and is representative of said afterglow amplitude, $\tau$ is a function of said parameter signal and is representative of said afterglow time constant, and $\Delta$ is representative of a sampling interval for said output signal.

6. A system for processing an output signal generated by a detector, the detector being characterized by a first transfer function and the detector generating the output signal according to a function of an intensity of radiation incident on the detector, the system including:

(A) means for measuring the temperature of the detector and for generating a parameter signal as a function of said temperature; and (B) means for receiving the output signal and said parameter signal and including filter means for filtering the output signal and thereby generating a compensated signal, said filter means being characterized by a second transfer function, said second transfer function being substantially an inverse of at least a portion of said first transfer function, said filter means including means for adjusting said second transfer function according to a function of said parameter signal.

7. A computed tomography scanning system, comprising:

(A) tomography means for generating data for a tomographic scan including (i) means for generating radiation; (ii) detector means for generating at least one output signal in response to at least a portion of the radiation generated by the means for generating radiation and incident on the detector means, said detector means having a signal response characterized by afterglow represented by at least one afterglow amplitude and at least one afterglow time constant; and (iii) means for rotating at least the means for generating radiation about a rotation axis during the tomographic scan;

(B) means for measuring a temperature of the detector means and for generating a parameter signal according to a function of said temperature, said parameter signal being representative of said afterglow amplitude and said afterglow time constant.

8. A system according to claim 7, further including means for generating a compensated signal according to a function of the output signal and said parameter signal.

9. A system according to claim 8, wherein said means for generating a compensated signal generates said compensated signal according to the following equation $$y_i = c_0 x_i + c_1 x_{i-1} + c_2 y_{i-1}$$

wherein $y_i$ represents a current sample of said compensated signal, $Y_{i-1}$ represents a previous sample of said compensated signal, $x_i$ represents a current sample of said output signal, $x_{i-1}$ represents a previous sample of said output signal, and $c_0$, $c_1$, and $c_2$ are coefficients that are functions of said parameter signal.

10. A system according to claim 7, further including filter means for filtering the output signal and thereby generating a compensated signal, said filter means being characterized by a transfer function and including means for adjusting said transfer function according to a function of said parameter signal.

11. A system according to claim 10, wherein said transfer function is substantially equal to $$\delta_i = \beta e^{-\frac{i\Delta}{\tau}}$$

wherein β is a function of said parameter signal and is representative of said afterglow amplitude, τ is a function of said parameter signal and is representative of said afterglow time constant, and Δ is representative of a sampling interval for said output signal.

12. A system according to claim 7, wherein said means for measuring a temperature includes means for generating said parameter signal prior to a beginning of the tomographic scan.

13. A system according to claim 7, further including means for generating a set of samples $x_i$ of said output signal for all integers i from zero to MAX.

14. A system according to claim 13, further including processing means including a set of N sub-processors for processing said samples $x_i$, each of said sub-processors represented by a unique integer number q selected from zero to N minus one, and receiving only the samples $x_{iN+q}$ for all integers i and for all integers q from zero to N minus one, each said sub-processors further including means for generating a compensated signal according to a function of at least a portion of the samples $x_{iN+q}$ and said parameter signal.

15. A system according to claim 13, further including processing means including a set of N sub-processors for processing said samples $x_i$, each of said sub-processors represented by a unique integer number q selected from zero to N minus one, and receiving only the samples $x_{iN+q}$ for all integers i and for all integers q from zero to N minus one, each of said sub-processors including filter means for filtering the samples $x_{iN+q}$ and thereby generating a compensated signal, said filter means being characterized by a transfer function and including means for adjusting said transfer function according a function of said parameter signal.

16. A system according to claim 13, said detector means being characterized by a first transfer function.

17. A system according to claim 16, further including processing means including a set of N sub-processors for processing said samples $x_i$, each of said sub-processors represented by a unique integer number q selected from zero to N minus one receiving only the samples $x_{iN+q}$ for all integers i and for all integers q from zero to N minus one, each of said sub-processors including filter means for filtering the samples $x_{iN+q}$ and thereby generating a compensated signal, said filter means being characterized by a second transfer function, said second transfer function being substantially an inverse of at least a portion of said first transfer function.

18. A computed tomography scanning system, comprising:
(A) tomography means for generating data for a tomographic scan including (i) means for generating radiation; (ii) detector means for generating at least one output signal in response to at least a portion of the radiation generated by the means for generating radiation and incident on the detector means, said detector means being characterized by a first transfer function; and (iii) means for rotating at least the means for generating radiation about a rotation axis during the tomographic scan;
(B) means for measuring the temperature of the detector and for generating a parameter signal as a function of said temperature; and
(C) means for receiving the output signal and said parameter signal and including filter means for filtering the output signal and thereby generating a compensated signal, said filter means being characterized by a second transfer function, said second transfer function being substantially an inverse of at least a portion of said first transfer function, said filter means including means for adjusting said second transfer function according to a function of said parameter signal.

19. A system according to claim 18, wherein said filter means includes a recursive filter.

20. A system according to claim 19, wherein said recursive filter is a digital filter.

21. A computed tomography scanning system, comprising:
(A) tomography means for generating data for a tomographic scan, including (i) means for generating radiation; (ii) detector means for generating at least one output signal in response to at least a portion of the radiation generated by the means for generating radiation and incident on the detector means, the signal response of said detector means being characterized by afterglow represented as a function of at least one afterglow amplitude and at least one afterglow time constant; (iii) means for rotating at least the means for generating radiation about a rotation axis during the tomographic scan; and (iv) means for sampling the output signal during the tomographic scan and thereby generating a plurality of samples $x_i$ for all integers i from zero to MAX;
(B) processing means including a set of N sub-processors for processing said samples $x_i$, a q'th one of said sub-processors receiving only the samples $x_{iN+q}$ for all integers i and for all integers q from zero to N minus one, said q'th sub-processor further including means for generating a compensated signal according to a function of at least a portion of the samples $x_{iN+q}$ and parameters representative of said afterglow amplitude and said afterglow time constant.

22. A system according to claim 21, wherein said means for generating a compensated signal comprises a recursive filter.

23. A system according to claim 21, wherein said means for generating a compensated signal generates said compensated signal according to the equation $$y_{Ni+q} = d_0 x_{Ni+q} + d_1 x_{N(i-1)+q} + d_2 y_{N(i-1)+q}$$

wherein $y_{Ni+q}$ represents a current sample of said compensated signal generated by said q'th sub-processor, $y_{N(i-1)+q}$ represents a previous sample of said compensated signal generated by said q'th sub-processor, $x_{Ni+q}$ represents a current sample of said output signal received by said q'th sub-processor, $x_{N(i-1)+q}$ represents a previous sample of said output signal received by said q'th sub-processor, and $d_0$, $d_1$, and $d_2$ are coefficients that are functions of said afterglow amplitude, and said afterglow time constant.

24. A system according to claim 23, wherein said coefficients $d_0$, $d_1$, and $d_2$ are given by the equation $$\begin{aligned} d_0 &= 1 - N\beta \\ d_1 &= -\alpha \\ d_2 &= \alpha \end{aligned} \quad (13)$$

$$a = e^{-\frac{N\Delta}{\tau}}$$

wherein β is representative of said afterglow amplitude, τ is representative of said afterglow time constant, and Δ is representative of a sampling interval of said output signal.

25. A system according to claim 21, further including means for measuring the temperature of said detector means and for generating a parameter signal according to a function of said temperature, said parameter signal being representative of said afterglow amplitude and said afterglow time constant.

26. A system according to claim 25, wherein said means for generating a compensated signal includes means for generating said compensated signal according to a function of at least a portion of the samples $x_{iN+q}$, and said parameter signal.

27. A computed tomography scanning system, comprising:
   (A) tomography means for generating data for a tomographic scan, including (i) means for generating radiation; (ii) detector means for generating at least one output signal in response to at least a portion of the radiation generated by the means for generating radiation and incident on the detector means, the signal response of said detector means being characterized by afterglow represented as a function of at least one afterglow amplitude and at least one afterglow time constant; (iii) means for rotating at least the means for generating radiation about a rotation axis during the tomographic scan; and (iv) meatas for sampling the output signal during the tomographic scan and thereby generating a plurality of samples $x_i$ for all integers i from zero to MAX;
   (B) processing means including a set of N sub-processors for processing said samples $x_i$, each of said sub-processors represented by a unique integer number q selected from zero to N minus one and receiving only the samples $X_{iN+q}$ for all integers i and for all integers q from zero to N minus one, said q'th sub-processor including filter means for filtering the samples $x_{iN+q}$ and thereby generating a compensated signal, said filter means being characterized by a transfer function, said transfer function being a function of parameters representative of said afterglow amplitude and said afterglow time constant.

28. A system according to claim 27, further including means for measuring the temperature of said detector means and for generating a parameter signal according to a function of said temperature, said parameter signal being representative of said afterglow amplitude and said afterglow time constant.

29. A system according to claim 28, wherein said filter means includes means for adjusting said transfer function according to a function of said parameter signal.

30. A computed tomography scanning system, comprising:
   (A) tomography means for generating data for a tomographic scan including (i) means for generating radiation; (ii) detector means for generating at least one output signal in response to at least a portion of the radiation generated by the means for generating radiation and incident on the detector means, said detector means being characterized by a first transfer function; (iii) means for rotating at least the means for generating radiation about a rotation axis during the tomographic scan; and (iv) means for sampling the output signal during the tomographic scan and thereby generating a plurality of samples $x_i$ for all integers i from zero to MAX;
   (B) processing means including a set of N sub-processors for processing said samples $x_i$, a q'th one of said sub-processors receiving only the samples $x_{iN+q}$ for all integers i and for all integers q from zero to N minus one, said q'th sub-processor including filter means for filtering the samples $x_{iN+q}$ and thereby generating a compensated signal, said filter means being characterized by a second transfer function, said second transfer function being substantially an inverse of at least a portion of said first transfer function.

31. A system according to claim 30, further including means for measuring a temperature of said detector means and for generating a parameter signal according to a function of said temperature.

32. A system according to claim 31, wherein said means for filtering the samples includes means for adjusting said second transfer function according to a function of said parameter signal.

* * * * *

UNITED STATES PATENT AND TRADEMARK OFFICE
CERTIFICATE OF CORRECTION

PATENT NO. : 5,644,610
DATED : July 1, 1997
INVENTOR(S) : Carl R. Crawford, et al It is certified that error appears in the above-indentified patent and that said Letters Patent is hereby corrected as shown below:

On the title page,
  item [62], delete "Division" and substitute therefor -- Continuation --.

Column 1, line 6, delete "Divisional" and substitute therefor -- Continuation --.

Column 6, line 6, delete "deconvohtion" and substitute therefor -- deconvolution --.

Claim 24, column 16, line 59, delete "α" and substitute therefor -- a --; and column 16, line 60, delete "α" and substitute therefor -- a --.

Claim 27, column 17, line 12, delete "scarming" and substitute therefor -- scanning --; and column 17, line 25, delete "meatas" and substitute therefor -- means --.

Signed and Sealed this

Fourteenth Day of October, 1997

Attest:

BRUCE LEHMAN

Attesting Officer

Commissioner of Patents and Trademarks